United States Patent [19]

Ahrens et al.

[11] Patent Number: 4,868,796
[45] Date of Patent: Sep. 19, 1989

[54] SYSTEM FOR DETECTING THE POSITION OF AN OBJECT RELATIVE TO A MANIPULATOR

[75] Inventors: Uwe Ahrens; Gerhard Drunk, both of Stuttgart, Fed. Rep. of Germany

[73] Assignee: Edelhoff M.S.T.S., Iserlohn, Fed. Rep. of Germany

[21] Appl. No.: 895,932

[22] Filed: Aug. 13, 1986

[30] Foreign Application Priority Data

Aug. 13, 1985 [DE] Fed. Rep. of Germany ....... 3529049
Sep. 17, 1985 [DE] Fed. Rep. of Germany ....... 3533168

[51] Int. Cl.⁴ .................................................. G01S 15/06
[52] U.S. Cl. .......................................... 367/96; 367/99
[58] Field of Search ................... 367/95, 96, 97, 99; 901/2, 46; 73/628

[56] References Cited

U.S. PATENT DOCUMENTS

| | | | |
|---|---|---|---|
| 2,743,429 | 4/1956 | Erdman et al. | 367/96 |
| 2,975,851 | 3/1961 | Youmans et al. | |
| 3,241,687 | 3/1966 | Orloff | |
| 3,493,920 | 2/1970 | MacMunn | 367/96 |
| 3,513,931 | 5/1970 | Warner et al. | 367/96 |
| 3,749,197 | 7/1973 | Deutsch | |
| 3,888,362 | 6/1975 | Fletcher et al. | |
| 4,200,921 | 4/1980 | Buckley | |
| 4,216,538 | 8/1980 | Tomlinson et al. | |
| 4,260,187 | 4/1981 | Bejczy | |
| 4,295,740 | 10/1981 | Sturges, Jr. | |
| 4,302,286 | 11/1981 | Lefebvre et al. | |
| 4,326,155 | 4/1982 | Griebeler | 367/95 |
| 4,344,160 | 8/1982 | Gabriel et al. | |
| 4,402,603 | 9/1983 | Lill | 356/152 |
| 4,423,998 | 1/1984 | Inaba et al. | |
| 4,472,668 | 9/1984 | Mutschler et al. | |
| 4,493,606 | 1/1985 | Foulke et al. | |
| 4,541,771 | 9/1985 | Beni et al. | |
| 4,557,386 | 12/1985 | Buckley et al. | |
| 4,634,947 | 1/1987 | Magori | |
| 4,635,241 | 1/1987 | Saglio | |
| 4,718,023 | 1/1988 | Arora | 901/46 |

Primary Examiner—Thomas H. Tarcza
Assistant Examiner—Daniel T. Pihulic
Attorney, Agent, or Firm—Morgan & Finnegan

[57] ABSTRACT

In a system for detecting the position of an object having predetermined design features in a plane relative to a manipulator provided with ultrasonic sensors consisting of ultrasonic transmitters and ultrasonic receivers, the manipulator is provided with at least three ultrasonic sensors, which are spaced apart and directed at an angle to a common reference plane, two of the sensors are directed to an elongate linear design feature of the object, the third sensor is directed to a second linear design feature of the object, the linear features are designed so that sound waves projected by the ultrasonic sensors and incident on the features will be reflected parallel to the direction of incidence, and the two linear design features are parallel to each other in a plane.

24 Claims, 7 Drawing Sheets

LINEAR FEATURE
ULTRASONIC SENSOR

FIG. 9
GENERAL CIRCUIT DIAGRAM FOR DISTANCE-MEASURING SENSOR

SYSTEM FOR DETECTING THE POSITION OF AN OBJECT RELATIVE TO A MANIPULATOR

BACKGROUND OF THE INVENTION

1. Field of the Invention

This invention relates to a system for detecting the position of an object having predetermined design features in a plane relative to a manipulator provided with ultrasonic sensors consisting of ultrasonic transmitters and ultrasonic receivers.

This invention relates also to a lifting and tipping mechanism for use on a garbage-collecting truck, which mechanism comprises a lifting arm, which carries a coupling device for cooperation with a mating coupling device mounted on a garbage bin.

2. Description of the Prior Art

When it is desired to automatically align a manipulator, which may consist, for example, of a gripper or coupling device, relative to an object that is to be gripped or manipulated, the position of the manipulator relative to the object in two planes crossing preferably at right angles must be detected so that the drive means for moving the manipulator can properly be actuated under the control of a preferably electronic controller in dependence on the coordinates which have been detected.

Video-optical sensors may be used as sensors for determining the position of two objects relative to each other but due to their high costs their use is highly restricted because they depend on illuminating conditions, color contrasts and positions to be detected. Such video-optical sensors are also highly delicate and may be damaged when used under rough operating conditions, such as with garbage bins in the collection of garbage. Moreover, it is also very difficult to obtain the required distance information by means of video-optical sensors.

Ultrasonic sensors consisting of ultrasonic transmitters and ultrasonic receivers are less liable to be deranged and more suitable for rough handling. But ultrasonic sensors which are presently known can only measure a distance between the sensor and a plane surface, although an aligning adjustment in lateral and vertical directions is also necessary when a manipulator is to be used to detect the position of an object to be handled and, subsequently, to grip that object.

The handling of a device for coupling a manipulator to an object will greatly be facilitated if an alignment is effected by an automatic adjustment in one plane so that, for example when it is desired to couple the object to the manipulator it will be sufficient subsequently to perform a preferably straight movement in a plane. Such movement can easily be controlled by hand.

Various lifting and tipping mechanisms of the kind described hereinbefore are known. For collection of garbage by garbage-collecting trucks provided with such mechanisms, the garbage-collecting workers place the garbage bin onto the coupling device so that the bins can be coupled and can be lifted and tipped when the garbage bins have been locked to the coupling device.

Published German application 34 20 058, which is not a prior publication, discloses a lifting and tipping mechanism which comprises at least one lifting arm that is pivotally movable about a transverse axis of a pouring unit or of the chassis of the truck and which at its free end carries a base rail, disposed parallel to the transverse axis and is pivotally movable between a receiving position, in which the rail is disposed genally below and in front of the driver's cab, and a pouring position in which the rail is disposed above and behind the drivers cab. The lifting arm is provided with extensible or pivoted means for a gripping of or for a coupling to a garbage bin. If the driver of a garbage-collecting truck provided with such lifting and tipping mechanism has sufficient experience and skill, he can move the truck close to a garbage bin and can couple the lifting and tipping mechanism to the garbage bin and can then lift, empty and return the garbage bin to rest. However, although the driver's cab and the driver's seat are so arranged that the driver can clearly view the coupling region, it is most difficult to control the coupling claw of the lifting arm in the region in which the coupling to the garbage bin is to be effected.

SUMMARY OF THE INVENTION

It is a first object of the invention to provide a system which is of the kind described first hereinbefore and which permits the position of a manipulator to an object to be detected with the aid of ultrasonic sensors in such a manner that the manipulator can be approached to the object in at least one plane in an automatic operation.

It is a second object of the invention to provide a lifting and tipping mechanism which is of the kind described first hereinbefore and which can be automatically coupled to the garbage bin so that the success of the coupling operation no longer depends on the skill of the driver.

In accordance with the invention the first object is accomplished in a system of the kind described first hereinbefore in that the manipulator is provided with at least three ultrasonic sensors, which are spaced apart and directed at an angle to a common reference plane, two of the sensors being directed to an elongate linear design feature of the object and the third sensor being directed to a second linear design feature of the object, the linear features being so designed that sound waves projected by the ultrasonic sensors and incident on the features will be reflected parallel to the direction of incidence, and the two linear design features being parallel to each other in a plane.

By means of the system in accordance with the invention the position of an object relative to a manipulator can be defined in one plane by the three coordinates X and Y and the angle of rotation C about a point that is defined by the coordinates X and Y. The relative arrangement provided in accordance with the invention between the ultrasonic sensors and the linear features will permit measurement of the distance from the linear features to the sensors. Because two ultrasonic sensors are directed to at least one linear feature and another ultrasonic sensor is directed to another linear feature, the position in one plane can be exactly defined. The position-defining measurements can be repeated until the manipulator has been moved to the desired position relative to the object under the control of suitable controllers.

In the system in accordance with the invention the width of the sound lobe of each ultrasonic sensor must be so selected that the associated linear feature will remain within the sound lobe of the associated ultrasonic sensor throughout the permissible range of positions in which the object is to be detected. Otherwise, detection will not be possible. Moreover, direct reflection from the surface of the object to the ultrasonic sensor must be avoided because the sound which is incident on a plane surface will be reflected at its angle of incidence. For this reason all ultrasonic transducers must have such an oblique orientation relative to the surface of the object so that all sound waves which are incident on the surface will be reflected out of the range from which sound can be received by the sensor and reception of direct echoes will be avoided. The desired reflection of the sound waves must be effected only at the linear features. On the object, and close to the object, there must be no parts which are disposed within the sound lobes of the sensors which would generate disturbing echoes. For this reason the sound lobes of the ultrasonic sensors must have such a configuration that regions in which disturbances may occur will not be disposed in the range which can be sensed by the sensor.

It will be understood that the system in accordance with the invention permits a detection in one plane of objects of various kinds, for example, of an object standing on an approximately plane surface. Such object may consist of a garbage bin. In that case it will be sufficient for a coupling of the manipulator to the object consisting, for example, of a garbage bin, to detect the elevation of the manipulator above the ground. That elevation may also be detected in a simple manner by means of an ultrasonic sensor.

The system in accordance with the invention is more rugged and less liable to be deranged than systems employing video-optical sensors. The function of the ultrasonic sensors and of the reflectors constituted by the linear design features cannot be adversely affected by dirt. The system provides the required information not only regarding the distance from the manipulator to the object but permits also an alignment to be effected by an adjustment in a lateral or vertical direction and the achieving of a lateral and vertical safety clearance.

The system is inexpensive and is insentive to environmental conditions, such as illumination, dust, splashed water, temperature and mechanical shock. Disturbing influences from the environment of the object need not be feared.

The ultrasonic sensors are suitably arranged in a common plane so that the processing of the signals in electronic matching and computing circuits will be simplified.

It will also be desirable to arrange the ultrasonic sensors on a common straight line because this will further simplify the arithmetic of the operations.

A fourth ultrasonic sensor is suitably provided and is directed to the second linear feature. The fourth ultrasonic sensor may serve to define the coordinates of a second point disposed in the plane in which detection is effected; in such case the detection of an angle of rotation about the first point can be omitted. It will be more desirable, however, to use the measurement taken by the fourth ultrasonic sensor as a redundant measured value for a plausibility check.

The linear design features may consist of ribs protruding at right angles from a planar surface of the object to be detected, or of scores or groovelike recesses formed in such surface and defined by at least two side faces and/or walls extending at right angles to each other, so that incident sound waves will be reflected twice and will return in their original direction of incidence.

Alternatively, the linear features may consist of rough strip-shaped surfaces, which will reflect incident sound waves in all directions, including the direction of incidence. An omnidirectional reflection also will be effected, for example, on ribs protruding from the object.

For detection of the object in all dimensions, it is possible within the scope of the invention to provide a second group of ultrasonic sensors, which are directed at an angle, preferably at right angles, to the direction in which the first group of ultrasonic sensors are directed and to detect additional linear design features associated with the ultrasonic sensors of the second group.

The detection of the three dimensions X, Y, Z may be supplemented by the detection of three orientations A, B, C about the axes in space if dot-like sound-reflecting features, such as triple mirrors, are provided.

A mutual interference of the ultrasonic sensors may be avoided in that individual ultrasonic sensors are activated at different times and a safety interval of time is provided between consecutive activation periods. That interval of time should be sufficient for an attenuation of any echo produced by multiple reflection so that such echoes can no longer be detected.

Mutual interference can also be precluded in that the ultrasonic sensors are operated at different frequencies. However, in such case a mutual influence can only be prevented if an occurrence of disturbing beat frequencies is avoided.

The manipulator provided with the measuring and detecting system described hereinbefore can be used with special advantage for an automatical control of a lifting and tipping mechanism for use on a garbage-collecting truck, which mechanism comprises a lifting arm, which carries a coupling device for cooperation with a mating coupling device mounted on a garbage bin.

In a lifting and tipping mechanism of the kind described first hereinbefore the second object of the invention is accomplished in that the coupling device carried by the lifting arm is adapted to be lifted and lowered and to be laterally extended or laterally pivoted relative to the garbage-collecting truck and is pivotally movable about a vertical axis relative to the garbage-collecting truck by suitable drive means, the coupling device or parts connected to the coupling device is provided with sensors, which consists of transmitters and receivers adapted to detect the elevation of the coupling device over the surface on which the garbage bin is supported, and to detect special marks or contours and/or outlines of the garbage bin so as to measure the distance from the coupling device to the garbage bin, and providing a controller which in dependence on the output signals of the sensors causes the drive means to move the coupling device carried by the lifting arm into a coupling engagement with the coupling device of the garbage bin.

By means of the lifting and tipping mechanism of the invention, the collection of garbage can be substantially automated. It will be sufficient for the driver to move the coupling device carried by the lifting arm of the lifting and tipping mechanism to such a position adjacent to the garbage bin that is to be emptied so that the sensors can detect marks or contours on the garbage bin and so that the automatic control which is provided will automatically effect the coupling and subsequent lifting and tipping of the garbage bin. The coupling device provided on the garbage bin may consist of an approximately triangular coupling pocket, which has at its top a centrally disposed, rounded apex, and which has a substantially flat outer wall and an inner wall that extends upwardly and outwardly and is tapered like a wedge or rounded like a spherical segment so that the bin will be centered in the direction of two axes (x and y) and in the direction of its rotation about a vertical axis (c) as the bin is lifted. The coupling device provided on the lifting arm comprises a triangular coupling wedge having a shape which is complementary to said pocket.

To ensure that the coupling device of the lifting and tipping mechanism has the required degree of freedom, that mechanism may comprise at least one lifting arm, which is pivoted on a transverse axis of a pouring unit or of the chassis of the garbage-collecting truck and which at its free end carries a base rail, which is parallel to the transverse axis and pivotally movable between a pick-up position and a pouring position, and the coupling device may be longitudinally displaceable on and guided by a horizontal carrier, which is pivoted on a vertical axis to a pivoted arm, which is pivoted on a second vertical axis to a carrier, which is displaceable on and guided by the base rail.

The controller which is responsive to the sensors suitably comprises an automatic control system, which after an approach of the coupling device to the garbage bin, controls the drive means for effecting a coupling engagement, locking, lifting, pouring and replacing the garbage bin in a proper position.

The elevation of the coupling claw above the roadway may be detected by means of sensors which cause the controller to maintain the coupling claw in a predetermined elevation above the roadway.

The garbage bin may be provided with beads, flutes or ribs, which are detected by the sensors.

The sensors suitably consist of distance-measuring ultrasonic sensors.

The sensors or feelers may alternatively consist of scanners, television cameras and other means which are capable of making a distance measurement and of controlling the coupling device.

BRIEF DESCRIPTION OF THE DRAWING

FIG. 4 is a sectional view showing various embodiments of linear features for reflecting sound waves.

DETAILED DESCRIPTION OF THE PREFERRED EMBODIMENT

An illustrative embodiment of the invention will now described more in detail with reference to the drawing.

Figure 1:
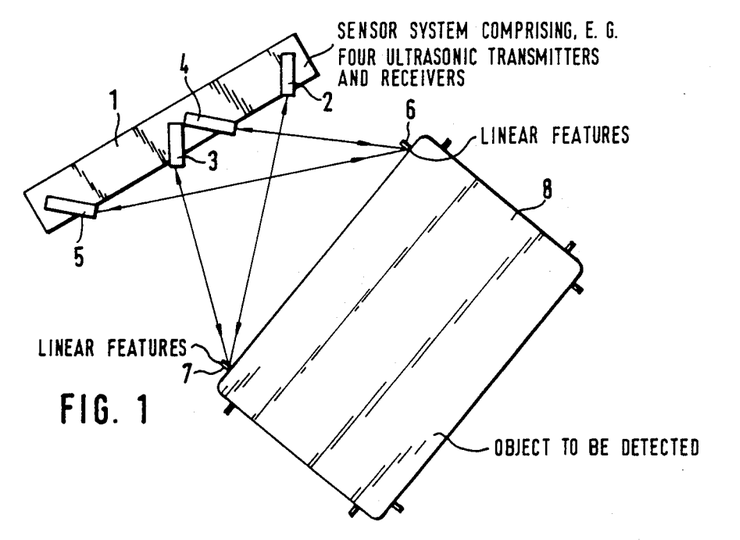
FIG. 1 is a diagrammatic top plan view showing a gripper, which is provided with ultrasonic sensors and is part of a lifting and tipping mechanism of a garbage truck; the coupling claw is shown as it approaches a garbage bin that is provided with linear design features.

The system illustrated in FIG. 1 includes, by way of example, a diagrammatically shown base carrier 1 of a coupling device of a lifting and tipping mechanism of a garbage truck. The coupling device includes a coupling claw, which is not shown and carries two pairs of ultrasonic sensors 2, 3 and 4, 5 for measuring the distance from the sensors to parallel ribs 6, 7, which project at right angles from the front wall of the garbage bin 8. The ultrasonic sensors 2, 3, 4, 5 project sound in a common sensing plane and are directed at an angle to a second plane, which is at right angles to the first. The linear design features consisting of the ribs 6, 7 are spaced a predetermined distance apart so that the point at which the linear feature 7 intersects the sensing plane can be derived by a computation from the distances measured by means of the ultrasonic sensors 2, 3 and the rotation of the garbage bin 8 about the point that is defined by the linear feature 7 can be derived by a computation from the distance to the linear feature 6, which latter distance is represented by the outputs of the ultrasonic sensors 4, 5, which measure the distance to the linear feature 6.

The distance measured by the ultrasonic sensors 4 or 5 is not required for a computation of the angle of rotation and is processed as a redundant value for a plausibility check.

Figure 2:
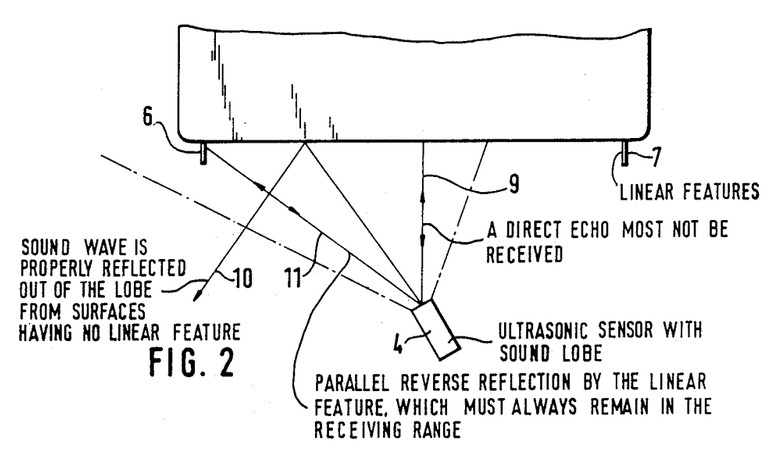
FIG. 2 is a diagrammatic representation of the configuration of the sound lobe of an ultrasonic sensor.
Figure 3:
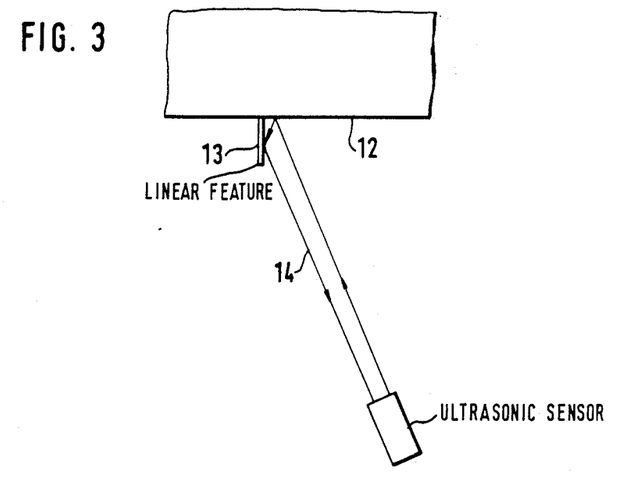
FIG. 3 illustrates the reflection of ultrasonic waves at and by a rib which extends at right angles from a planar surface of the object.

It is apparent from FIG. 2 that the angle of inclination of the directions in which the ultrasonic sensors are directed are so selected that sound waves which are directly reflected, such as the directly reflected echo signal 9, will not be incident on the receivers of the ultrasonic sensors. All sound waves 10 which are not used for the measurement must be reflected in such a manner that a disturbing echo will not be received. Only that sound wave 11 which is incident on the linear feature 6 of 7 will be reflected twice so that it returns parallel to itself. The nature of the reflection by a linear feature is illustrated in FIG. 3. Because the angle of incidence equals the angle of reflection, the double reflection on the bin wall 12 and the rib 13 results in the illustrated parallel reflection of the sound wave 14.

FIG. 4 shows possible designs of linear features for effecting a parallel reflection of incident sound waves. FIG. 4a shows an illustrative embodiment comprising a rib which projects from a wall surface at right angles thereto.

The illustrative embodiments shown in FIGS. 4b to 4e comprise grooves or indentations defined by side faces or wall portions which are at right angles to each other. Said wall portions may differ in thickness or may differ in shape. The illustrative embodiment shown in FIG. 4c comprises a step, which can also easily be formed in the object to be detected.

Figure 4A:
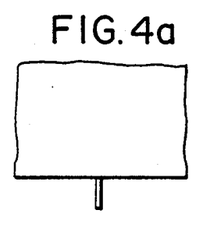
FIGS. 4(a) through 4(f) are sectional views showing various embodiments of the linear features for reflecting sound waves.
Figure 4B:
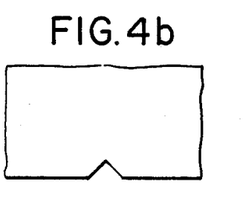
Figure 4C:
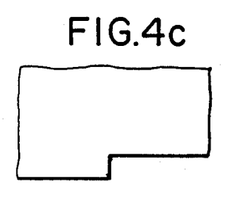
Figure 4D:
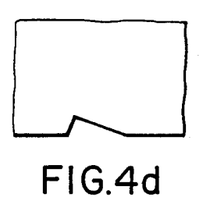
Figure 4E:
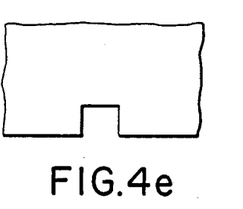
Figure 4F:
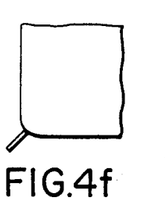

In the illustrative embodiment shown in FIG. 4f the object is provided at a corner with a weblike extension, which effects a reflection of sound in all directions.

By means of the sensor system which has been described, the position of a bin can be defined by the coordinates x and y and by the angle of rotation C in the plane. The coordinates x and y respectively the lateral displacement and the distance to the vehicle. C represents the angle of rotation on the supporting surface, which is assumed to be approximately planar. The position is determined in that the distances to two linear features extending at right angles to the sensing plane are measured. Each of such linear features is sensed in two directions by an array of distance-measuring ultrasonic sensors.

By means of the ultrasonic sensors, distance is measured as a function of travel time. The time between the transmission of an ultrasonic pulse and the reception of the echo signal which has been reflected by the nearest obstacle is evaluated in consideration of the velocity of sound in air. Specifically, in a plane which is parallel to the ground, two distance-measuring sensors direct beams at different angles to vertically extending linear features which are provided on the bin to be detected and are spaced a fixed distance apart. Data defining the location of a linear feature can then be derived from the two distances to the linear feature in different directions. The orientation of the bin can additionally be derived from the detected position of the second linear feature.

The linear features may consist of narrow strips, which reflect in all directions. As has been described hereinbefore it will be sufficient to provide simple edges, which are desirable for structural reasons in any case on stiffening ribs.

The comparison between the detected position of the two linear features and the known fixed distance between said features can be used for a plausibility check of the measured values.

The four distances which have been measured are input into a computer and by means of trigonometric calculations are converted by the computer to the desired relative values x, y, C, which can then be utilized for a position control of additional axes of the gripper.

The computer is also used for a control of the entire sequence.

The sensor system which has been described affords particularly the following advantages over other possible arrangements:

The system is inexpensive because ultrasonics are used and because the arrangement is optimized;

The system will not be affected by environmental influence, such as illumination, dust, splash water, temperature and mechanical impact;

The features provided on the bins are inexpensive and structurally desirable.

The measurement is substantially independent of the presence of objects near the bin.

The lateral position of the bin is detected.

Because it is sufficient to detect only a portion of the bin the measuring method does not require a large distance between the sensor and the bin.

The linear features must be so designed that a sound wave which is propagated within the sound lobe and incident on the feature at any desired angle will reflect back parallel to itself in the same direction.

As is apparent from the drawing, that requirement is met, for example, by right-angled corners. No matter the angle of incidence, the sound wave which is incident on the first plane of the corner will be reflected to the second plane and will be reflected by such second plane in the direction of the incident wave. An effective reflecting area may be constituted by the projected area of the two planar surfaces which define the corner, as viewed from the sensor. A favorable property of the corner which is utilized in this case resides in the fact that no matter the length of the path of the reflected light between the two lateral planes, the total length of the path traveled by the sound wave will always equal the length of the path to and back from the corner point.

It will be sufficient to provide features consisting of internal or external corners, such as are often provided or at least useful in any case as stiffening ribs for structural reasons.

The relative arrangement of the distance-measuring ultrasonic sensors must meet the following requirements:

The received signals must not consist of direct echoes but only of signals that have been reflected by the linear features.

No echo signals from other portions of the bin must be received.

No echoes from external objects must be received.

The distance-measuring sensors must have a definite association with individual linear features.

The entire area to be detected must be covered by the sound lobes of the sensors.

The accuracy of the measurement will also depend on an adequate spacing of the sensors associated with a given feature.

In designing the set-up as regards the position and direction of each transducer and the width of its sound lobe, particularly the following requirements must be met:

Throughout the permissible range of positions of the object to be detected the linear feature must always remain within the sensing lobe of the sensor because otherwise there will be no detection.

Signals which have directly been reflected by the surface of the object must not be received. Sound which is incident on a planar surface will be reflected at its angle of incidence.

For this reason all ultrasonic transducers must project sound at such an oblique angle to the surface of the object that all sound waves which are incident on the surface of the object will be reflected out of the range of reception of the sensor so that direct echoes will not be received.

Within the sound lobe of the sensor no parts which would generate a disturbing echo must be present on or close to the object. In other words, the sound lobes of the sensor must have such a configuration that such disturbing parts will not extend in the sensing range of the sensor.

An illustrative embodiment of the measuring and detecting system that has been described with reference to FIGS. 1 to 4 will now be described more in detail with reference to FIGS. 5 to 9 as applied to a garbage-collecting truck.

Figure 5:
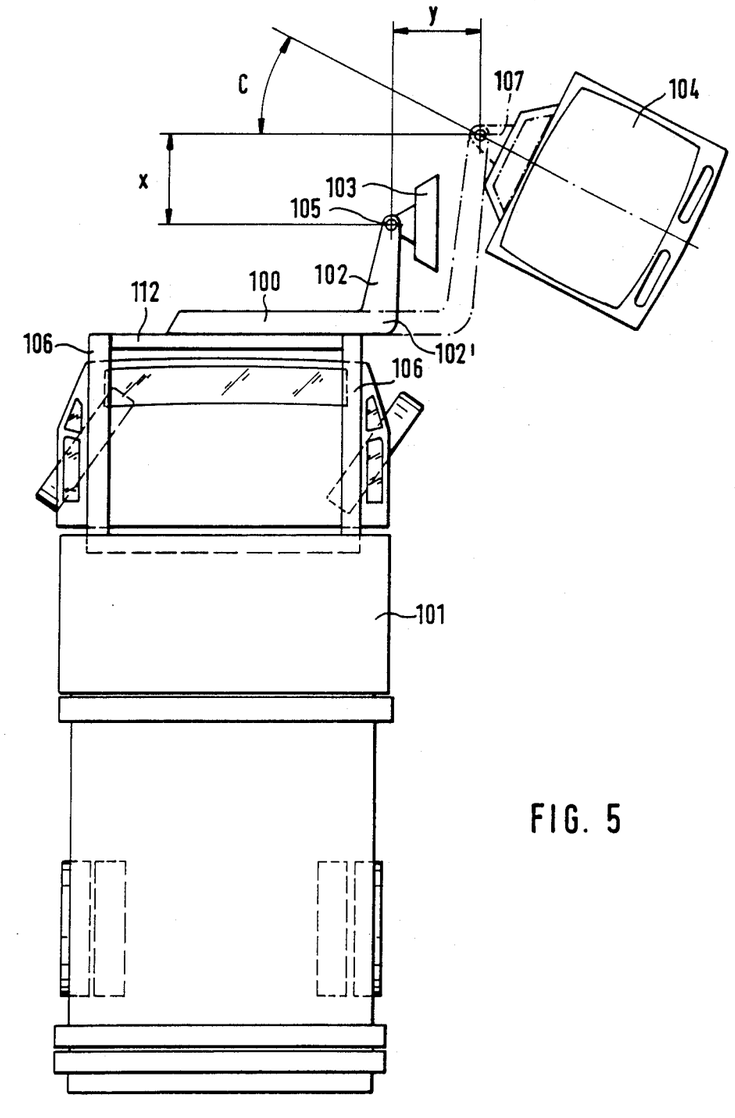
FIG. 5 is a diagrammatic top plan view showing a garbage-collecting truck provided with a lifting and tipping mechanism, which includes a bracket that is provided with a coupling claw for coupling the bracket to a garbage bin.

As is apparent from FIG. 5 a garbage-collecting truck 101 is provided at its front end with a lifting and tipping mechanism, which includes a pivoted bracket 102 and a coupling claw 103, which is pivoted to the bracket 102 on a vertical axis by the pivot 105. By means of suitable guiding, power-transmitting and drive means, the bracket 102 can be extended in the direction Y and the coupling claw 103 in the direction X. The coupling claw 103 is also pivotally movable about the pivot 105. Moreover, the lifting arms 106 are pivotally movable to raise and lower the coupling claw 103 relative to the surface on which the garbage bin 104 is supported. Owing to its degrees of freedom of movement, the coupling claw 103 can be moved from the position shwon in solid lines in FIG. 5 to its gripping position 107.

The bracket 102 is pivotally movable relative to the carrier 100 about the pivot 102'. Drive means, not shown, are provided for moving the carrier 100 and for pivotally moving the bracket 102.

Figure 6:
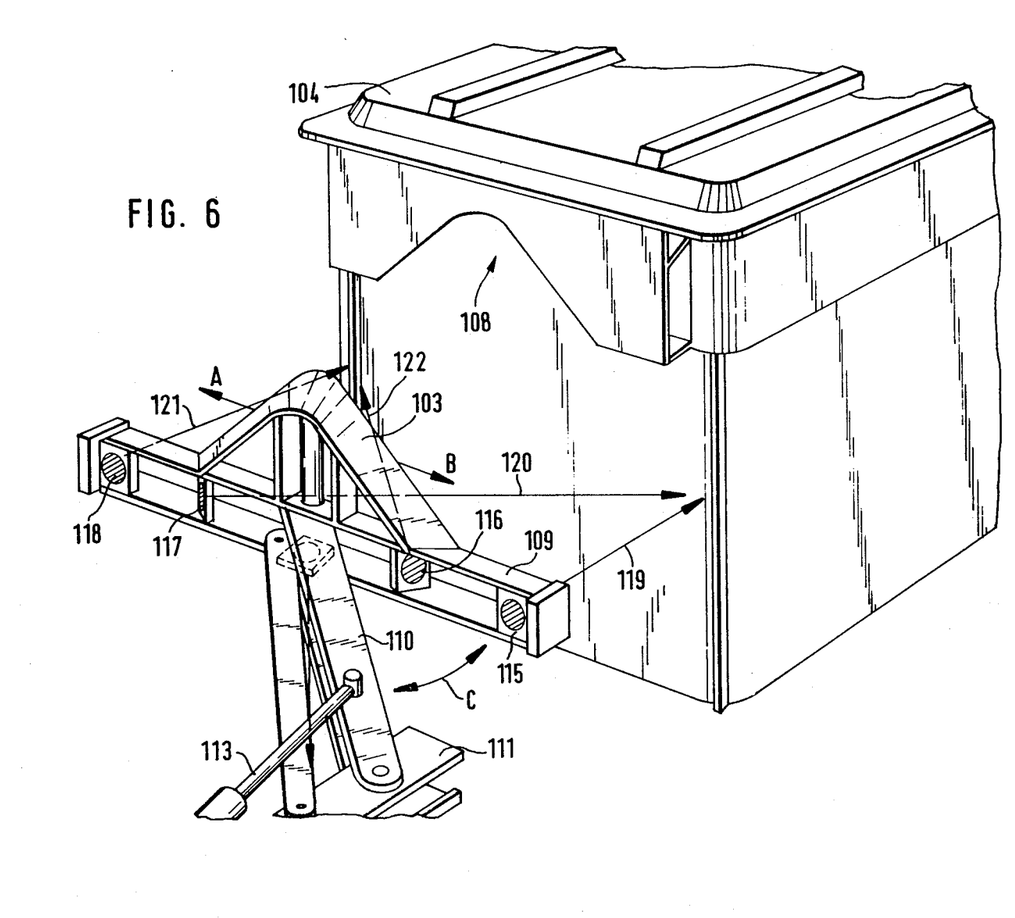
FIG. 6 is a perspective view showing a garbage bin and a coupling device for engaging said bin when the latter is in the detecting range of the sensors.

As is apparent from FIG. 6, the coupling claw 103 consists of an approximately triangular body, which has at its top a centrally disposed, rounded apex. The rear surface of the coupling claw 103 faces away from the garbage bin and is substantially planar. The rear surface of the coupling claw faces the garbage bin and is tapered in wedge shape or rounded like a spherical segment and extends downwardly and toward the garbage bin. The receiving pocket 108 provided in the garbage bin below its top edge has a shape which is complementary to the coupling claw 103.

The claw 103 is movable in tracks of the transverse coupling carrier 109 in the directions indicated by the arrows A, B by drive means which are not shown. The horizontal carrier 109 is pivoted to a pivoted bracket 110 on a vertical axis. Drive means, not shown, are operable to impart to the horizontal carrier 109 a pivotal movement in the directions indicated by the double-headed arrow C. The bracket 110 is pivoted to the carrier 111, which is guided by the base rail 112 (FIG. 5) of the lifting and tipping mechanism for a transverse movement in the direction Y. The base rail 112 connects the lifting arms 106. A pivotal movement can be imparted to the bracket 110 by means of a fluid-operable piston cylinder unit 113, which is pivoted to the bracket 110 and to the carrier 111. Such turning drive may be replaced by a cam and cam follower mechanism.

As is apparent from FIG. 6, the transverse carrier 109 is provided with direction-measuring sensors 115, 116, 117, 118, which project sensing beams 119, 120, 121, 122, which are incident on the edges of the garbage bin 104 and are reflected by those edges. The resulting echoes are received by the respective sensors.

Figure 7:
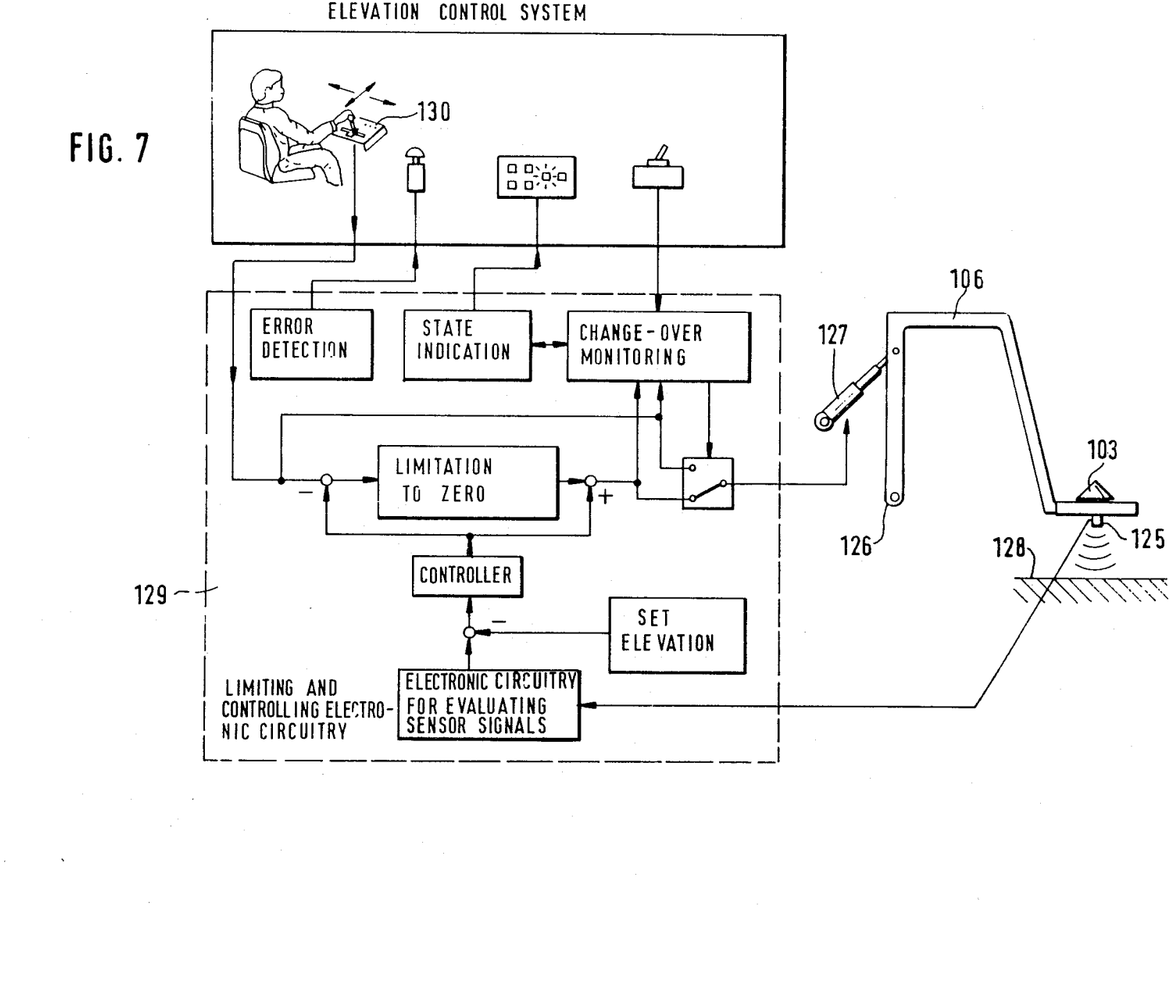
FIG. 7 is a diagrammatic view showing the controller for the lifting and tipping mechanism.

FIG. 7 shows by way of example the elevation control means. The coupling claw 103 connected to the lifting arms 106 is provided with a sensor 125. In dependence on the measured elevation above the supporting surface 128 the hydraulic cylinder 127 is operable to raise and lower the lifting arms 106 about their pivot 126.

The output signals of the sensor 125 are delivered to the electronic circuitry 129 and the desired elevation is subtracted from the output of said electronic circuitry 129. The resulting error signal is delivered to the controller, which in dependence on its input signal generates a positive or negative output signal, which controls the actuation of the hydraulic cylinder 127. The latter imparts to the bracket 106 a pivotal movement about the pivot 126 so that the coupling claw 103 is moved in an approximately vertical direction. As is apparent from the block circuit diagram (FIG. 7), an error-detecting unit, a state-indicating unit and a change-over monitoring unit are also provided.

The driver of the truck must actuate by hand only a control 130 for effecting the approach of the coupling claw 103 to the garbage bin. As soon as the sensors have detected the contours of the garbage bin, an automatic sequence will be initiated.

Figure 8:
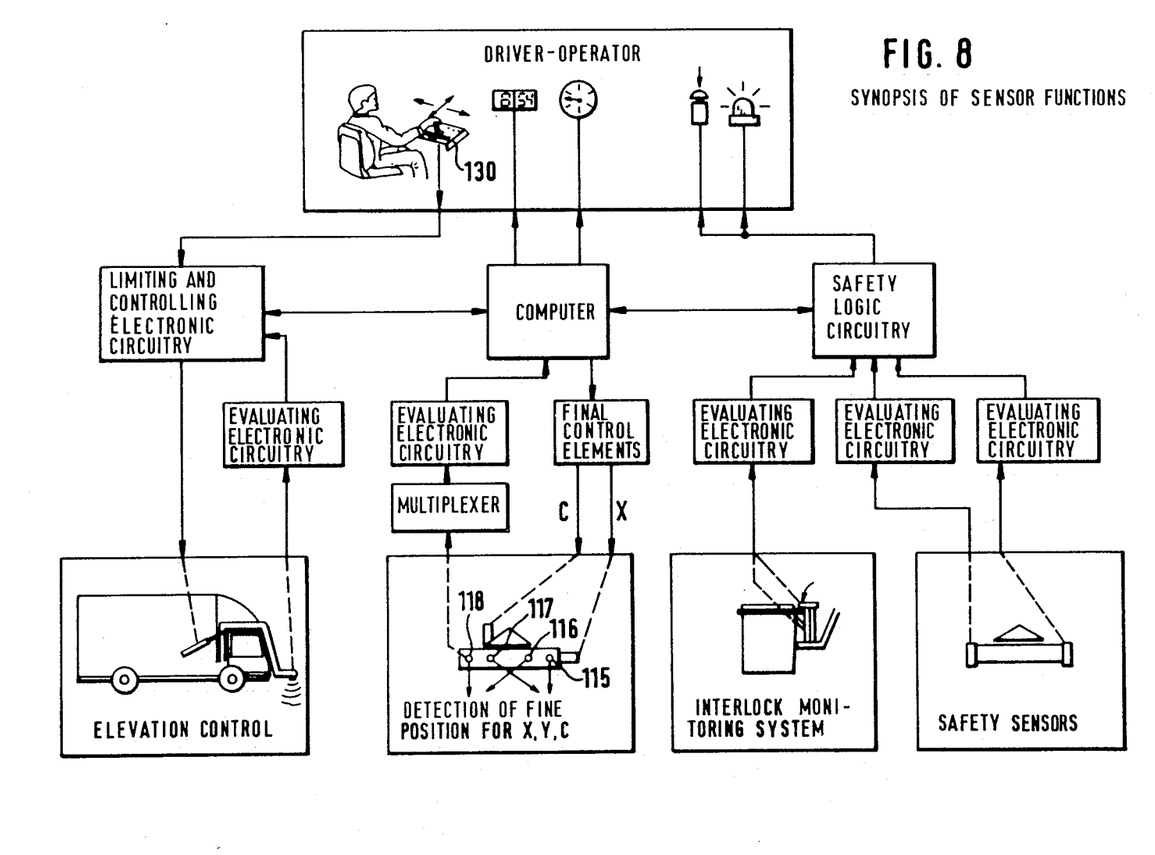
FIG. 8 is a diagrammatic view showing the coupling device, which is provided with the sensors, and the evaluating electronic circuitry.

FIG. 8 is a synopsis illustrating the processing of the outputs of the sensors carried by the coupling claw. The signals from the sensors 115, 116, 117, 118 are delivered via a multiplexer to an evaluating electronic circuitry and the output signals of the latter are processed by a computer.

Depending on those output signals and on the output signals of the limiting and controlling electronic circuitry, the computer generates control signals, which are delivered to the final control elements for moving the bracket 102 or 110 in the directions X and Y and for turning the coupling claw 103 in the sense C. The direction X is the direction of the longitudinal axis of the vehicle. The direction Y is the horizontal direction that is at right angles to the direction X. The rotation in the sense C is the sense of the pivotal movement of the coupling claw 103 relative to the bracket 103 or 110. By means of a function control lever 130, the operator of the garbage-collecting truck can give instructions to the limiting and controlling electronic system. The computer delivers information via display units, which can be read by the driver.

Figure 9:
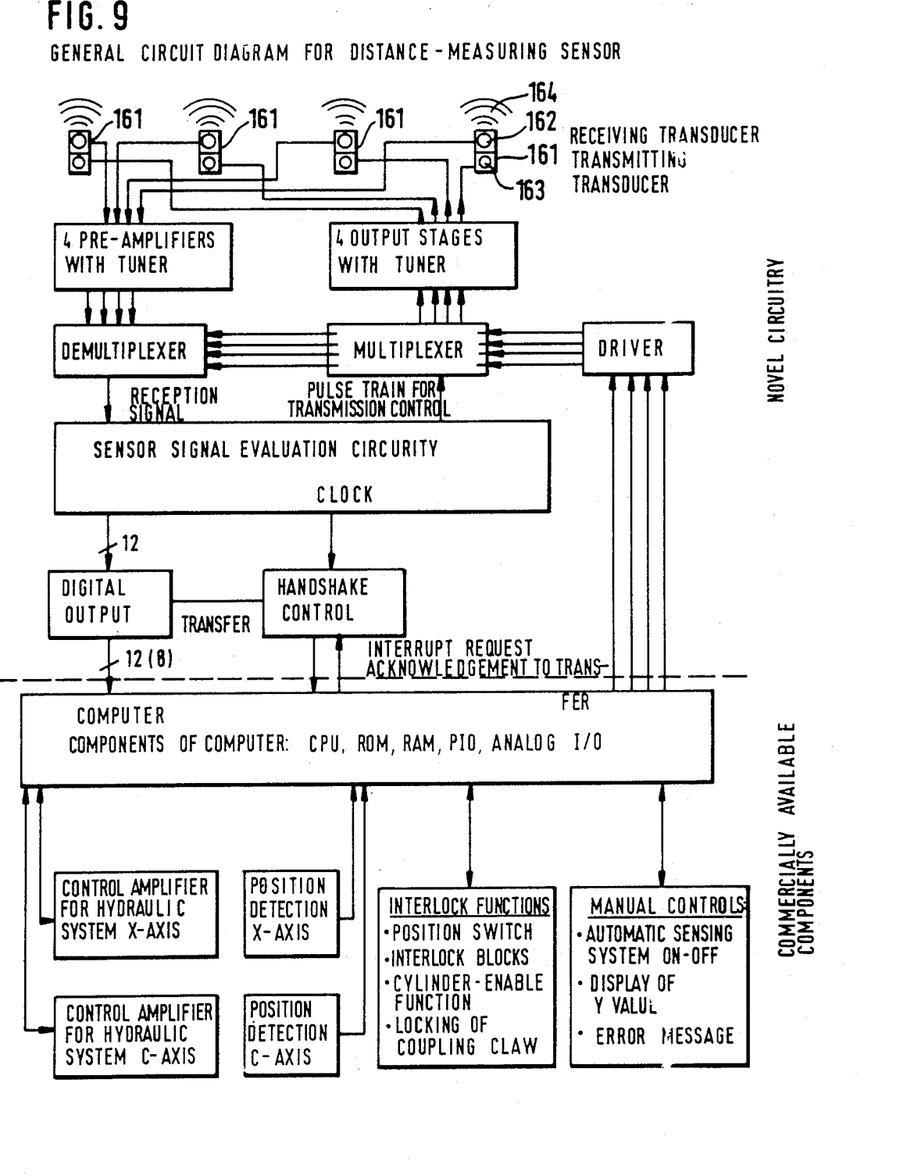
FIG. 9 is a block circuit diagram showing the sensors and the associated controller.

FIG. 9 is a general circuit diagram for the position-detecting sensors. Each of the four position-detecting sensors 161 comprises a receiving transducer 162 and a transmitting transducer 163. The computer consists of a microcomputer and by means of a driver and a multiplexer controls four output stages for the operation of the transmitting transducers 163 of the position-detecting sensors 162. Depending on the signals delivered by the output stage to the associated transmitting transducer 163, the latter transmits distance-measuring signals 164. Distance-measuring signals which have been reflected by the garbage bin are received and converted by the receiving transducers 162 and delivered to four pre-amplifiers. The signals which have been amplified in the preamplifiers are demultiplexed in a demultiplexer under the control of the multiplexer and are then delivered as a distance signal to a suitable evaluating circuitry. The output signals of said circuitry are delivered as digital output signals to a computer and are processed therein. The computer has a data exchange relation to the hydraulic system and to the control amplifier regarding the position with respect to the X axis and to the C axis. The positions with respect to the X axis and the C axis are communicated to the computer by two suitable position-detecting units. The computer is also in communication with a locking unit and with the manually operable controls.

The means for monitoring the locking function are apparent from FIG. 8 and preferably comprise inductive proximity initiators, which respond to the presence of metallic objects. This will permit a detection whether the U-shaped metallic locking member is in its closed position or is blocked by bins which are in an incorrect position.

The elevation control means described with reference to FIG. 7 are provided to avoid an unintended contact between the lifting arm and the ground. Such ground contact might otherwise be due to wrong manual operations or to the behavior of the vehicle. The main difficulty relates to the ability of the driver to estimate the differential elevation.

Whereas the downward movement of the gripper should be minimized, its freedom of movement above such minimum elevation must not be restricted. During a transverse movement of the pivoted arm, the elevation of the gripper above the ground shall be maintained also over steps, such as a curb. A distance-measuring ultrasonic sensor is provided for detecting the elevation of the gripper above the ground.

In the system which has been described hereinbefore, the handling arm is manually controlled for a coarse prepositioning. When the gripper is close to the bin, an automatic control sequence for a fine positioning is initiated, which is performed in dependence on the position of the coupling claw relative to the bin as determined by the position-detecting sensors.

The data determined by the sensors are converted to required position changes by a computer, which serves to control the operations and positions of the drive means for imparting movements to the coupling claw with respect to two additional axes. In this manner the coupling claw is rotated to a position in which it is parallel to the wall of the bin and a linear movement is imparted to the coupling claw until it registers with the pocket of the bin. The distance to the bin is still controlled by hand but can be indicated to the driver by a display provided in the driver's cab in order to facilitate the manual control. In that case an automatic control of the movements to be performed by the lifting arm with respect to its main axes will not be required.

The computer serves also to evaluate the signals obtained from the sensors and to automatically control the movement of the coupling claw with respect to its two axes. In connection with the position-detecting sensor array the computer serves to control the selection and activation of the individual sensors, to evaluate the results of measurement and to convert the results of such evaluation to data related to the coordinate system of the coupling claw. Moreover, the results derived from the sensor outputs are to be converted to desired positions with respect to the two axes of motion. The positions with respect to said axes must be input and the movements resulting in the desired position must be performed.

The states of the position limit switches for limiting the movements of the coupling claw relative to the axes and the actuation of the means for locking the coupling claw can also be checked.

We claim:

1. A system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane.

2. A system according to claim 1, characterized in that the ultrasonic sensors project sound in a common plane.

3. A system according to claim 1, characterized in that the ultrasonic sensors are disposed on a common straight line.

4. A system according to claim 1, characterized by the inclusion of a fourth ultrasonic sensor which is directed to the second linear feature.

5. A system according to claim 4, characterized in that the ultrasonic sensors are arranged symmetrically in pairs.

6. A system according to claim 1, characterized in that the linear features consist of ribs protruding at right angles from a planar surface of the object to be detected, or of scores or groovelike recesses formed in said surface and defined by at least two side faces or walls extending at right angles to each other.

7. A system according to claim 1, characterized in that the linear features consist of strip-shaped rough surface portions.

8. A system according to claim 1, characterized in that the linear features consist of webs protruding from edges of the object.

9. A system according to claim 1, characterized by the inclusion of a second group of ultrasonic sensors which are directed at an angle to the direction in which the ultrasonic sensors of the first group are directed and which serve to detect additional linear design features associated with said second group of ultrasonic sensors.

10. A system according to claim 9, characterized by the inclusion of dotlike sound-reflecting features.

11. A system according to claim 1, characterized in that the ultrasonic sensors are individually activated at different times.

12. A system according to claim 1, characterized in that the ultrasonic sensors are individually operated at different frequencies.

13. A system according to claim 1, characterized by the inclusion of a second group of ultrasonic sensors which are directed at right angles to the direction in which the ultrasonic sensors of the first group are directed and which serve to detect additional linear design features associated with said second group of ultrasonic sensors.

14. A system according to claim 10 characterized in that the dotlike sound-reflecting features are triple mirrors.

15. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with said ultrasonic sensors which are adapted to detect the elevation of said coupling device above the surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin.

16. A lifting and tipping mechanism for use on a garbage-collecting truck including a pouring unit and a chassis, said lifting and tipping mechanism comprising at least one lifting arm which is pivoted on a transverse axis of said pouring unit or of said chassis and which at its free end carries a base rail, which is disposed parallel to said transverse axis and pivotally movable between a pick-up position and a pouring position and carrying a coupling device for cooperation with a mating coupling device mounted on a garbage bin the coupling device carried by said at least one lifting arm being longitudinally displaceable on and guided by a horizontal carrier, which is pivoted on a vertical axis to a pivoted arm, which is pivoted on a second vertical axis to a carrier, which is displaceable on and guided by said base rail and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and idrected at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with said ultrasonic sensors which are adapted to detect the elevation of said coupling device above the surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin.

17. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with said ultrasonic sensors which are adapted to detect the elevation of said coupling device above the surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin, said controller including an automatic control system, which, when the coupling device approaches the garbage bin, activates the drive means and effects a coupling engagement with said garbage bin, and a locking, lifting, pouring and replacing of said garbage bin in a proper position.

18. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with said ultrasonic sensors which are adapted to detect the elevation of said coupling device above a roadway or supporting surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin, the sensors provided for detecting the elevation of the coupling device above said roadway or supporting surface including means for automatically maintaining the coupling device at a desired elevation above said roadway or supporting surface.

19. A lifting and tipping mechanism for use on a garbage-collecting truck, said mechanism comprising at least one lifting arm carrying a coupling device for cooperation with a mating coupling device mounted on a garbage bin provided with beads, flutes or ribs and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with said ultrasonic sensors which are adapted to detect the elevation of said coupling device above the surface on which said garbage bin is supported, and to detect said beads, flutes or ribs or the contours or outlines of said garbage bin and reflect therefrom energy emitted by said sensors and measure the distance from said coupling device to said garbage bin, and a controller for receiving the output signals of said sensors and activating said drive means to move said coupling device into a coupling engagement with said mating coupling device mounted on said garbage bin.

20. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with distance-measuring ultrasonic sensors, which consist of transmitters and receivers and which are adapted to detect the elevation of said coupling device above the surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin.

21. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with distance-measuring ultrasonic sensors, which are operated at a high frequency or project narrow beams and consist of transmitters and receivers and which are adapted to detect the elevation of said coupling device above the surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin.

22. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with a plurality of pairs of sensors, which consist of transmitters and receivers and the sensors of each pair of said plurality of pairs of sensors are adapted to detect the elevation of said coupling device above the surface on which said garbage bin is supported, and to detect an edge of said garbage bin and measure the distance from said coupling device to said garbage bin, and a controller for receiving the output signals of said sensors and activating said drive means to move said coupling device into a coupling engagement with said mating coupling device mounted on said garbage bin.

23. A lifting and tipping mechanism for use on a garbage-collecting truck, said mechanism comprising at least one lifting arm carrying a coupling device for cooperation with a mating coupling device mounted on a garbage bin and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with a plurality of pairs of sensors, which consist of transmitters and receivers and the sensors of each pair of said plurality of pairs of sensors emitting beams in directions extending at an angle to each other and are adapted to detect the elevation of said coupling device above the surface on which said garbage bin is supported, and to detect an edge of said garbage bin and measure the distance from said coupling device to said garbage bin, and a controller for receiving the output signals of said sensors and activating said drive means to move said coupling device into a coupling engagement with said mating coupling device mounted on said garbage bin.

24. A lifting and tipping mechanism for use on a garbage-collecting truck, said mechanism comprising at least one lifting arm carrying a coupling device for cooperation with a mating coupling device mounted on a garbage bin, a manual control element, an elevation controlling hydraulic system, a sensor unit for controlling said elevation-controlling hydraulic system and a presettable limiting, automatic control unit operably interposed between said manual control element and said sensor unit for controlling said elevation-controlling hydraulic system, and which lifting and tipping mechanism is provided with a system for detecting a position of an object having predetermined design features in a plane relative to a manipulator provided with ultrasonic sensors consisting of ultrasonic transmitters and ultrasonic receivers, characterized in that said manipulator is provided with at least three ultrasonic sensors, which are spaced apart and directed at an angle to said object and are disposed in a common reference plane, two of said sensors being directed to an elongated linear design feature of said object and the third sensor being directed to a second linear design feature of said object, the linear features being designed so that sound waves projected by the ultrasonic sensors and incident on said features are reflected parallel to the direction of the incidence, and the two linear design features being parallel to each other in said plane relative to said manipulator, whereby the position of said manipulator and said object with respect to each other is detected and said manipulator can be approached to said object in at least one plane and further characterized in that said lifting and tipping mechanism is laterally pivotable relative to said garbage-collecting truck and is pivotally movable about a vertical axis relative to said garbage-collecting truck by drive means, said coupling device, or parts connected thereto, being provided with sensors, which consist of transmitters and receivers and which are adapted to detect the elevation of said coupling device above the surface on which said garbage bin is supported, and to detect special marks or the contours or outlines of said garbage bin and measure the distance from said coupling device to said garbage bin, and a controller for receiving the output signals of said sensors and activating said drive means to move said coupling device into a coupling engagement with said mating coupling device mounted on said garbage bin.

* * * * *